US008274505B2

(12) United States Patent
Feng

(10) Patent No.: US 8,274,505 B2
(45) Date of Patent: Sep. 25, 2012

(54) DRIVING METHOD AND DEVICE FOR A DISPLAY

(75) Inventor: Yu-Hsiung Feng, Fongshan (TW)

(73) Assignee: Chimei Innolux Corporation, Chu-Nan (TW)

( * ) Notice: Subject to any disclaimer, the term of this patent is extended or adjusted under 35 U.S.C. 154(b) by 833 days.

(21) Appl. No.: 12/400,704

(22) Filed: Mar. 9, 2009

(65) Prior Publication Data

US 2009/0231322 A1 Sep. 17, 2009

(30) Foreign Application Priority Data

Mar. 14, 2008 (TW) ................................ 97108986 A

(51) Int. Cl.
*G06F 3/038* (2006.01)
*G09G 3/36* (2006.01)

(52) U.S. Cl. ........................................ 345/214; 345/691

(58) Field of Classification Search .................. 345/100, 345/213, 87, 204, 212, 214, 619
See application file for complete search history.

(56) References Cited

U.S. PATENT DOCUMENTS

2004/0041754 A1* 3/2004 Inukai ............................ 345/76
2008/0048999 A1* 2/2008 Chiang et al. ................ 345/204

* cited by examiner

*Primary Examiner* — Joseph Haley
*Assistant Examiner* — Andrew Sasinowski
(74) *Attorney, Agent, or Firm* — Liu & Liu

(57) ABSTRACT

The present invention relates to a driving device for a display and the method thereof for driving a pixel matrix containing N×M pixel units. The driving device for a display comprises: a first vertical driver generating N first vertical driving signals in sequence, each of N first vertical driving signals being used to drive the first through the K-th pixel units on each row of the pixel matrix; and a second vertical driver generating N second vertical driving signals in sequence, each of N second vertical driving signals being used to drive the (K+1)-th through the M-th pixel units on each row of the pixel matrix.

12 Claims, 9 Drawing Sheets

Low Resolution

High Resolution

DRIVING METHOD AND DEVICE FOR A DISPLAY

FIELD OF THE INVENTION

The present invention relates to a driving device for a liquid crystal display (LCD) and the method thereof, and more particularly, to a driving device for an LCD and the method thereof that extend the charge time through bilaterally driving the pixel matrix.

DESCRIPTION OF THE RELATED ART

Generally, small size liquid crystal displays (LCDs) are divided into two groups, depending on whether the LCD is or is not provided with a horizontal driver. With reference to FIG. 7, the construction of an LCD 20 having a horizontal driver is shown. The LCD 20 includes a pixel matrix 21, a controlling circuit (Application for Specific IC, ASIC) 22, and a driving device constructed by a vertical driver 23 and a horizontal driver 24.

The controlling circuit 22 is connected to the vertical driver 23 and the horizontal driver 24, and transmits the control signals STV, CKV, XCKV and ENB to the vertical driver 23 and the respective clock signals of the control signals STH, CKH and XCKH to the horizontal driver 24, such that the image display performance of the pixel matrix 21 may be controlled.

The horizontal driver 24 includes a plurality of horizontal shift registers (HSRs) and a plurality of horizontal switches (HSWs) (not shown). The HSRs are configured to receive the respective clock signals of the control signals STH, CKH and XCKH, and then output pulse signals in sequence to gradually switch on the HSWs. In more specifics, the first HSW is firstly switched on, and then the second HSW is conducted at a time point half the period of the clock signal of the control signal CKH later. In this manner, all the HSWs are gradually conducted to charge the pixel.

Please refer to FIG. 8, schematically showing that the pixel is charged through the ASIC and then a data line. The HSWs are gradually switched on after the gate of the vertical driver 23 has been conducted in such a way that the pixel is charged with the data output by the ASIC through the HSWs and Pixel TFT. In such manner, each the HSWs may have different cut-off periods and the pixels are still charged with data through the data line even though the time periods for conducting the respective HSWs in sequence are identical. In this case, the preceding pixels may be charged for a greater period in comparison with the later ones. Such period, during which the pixel is charged with the data line and, during which the HSW has been cut-off while the gate has not been cut-off yet, is termed as "sharing time". Moreover, when the voltage level of the data line is close to that of the pixel, the pixel may require a relatively greater period to reach the voltage level of the data line, and the later pixel may have a very short sharing time. Such characteristic is increasingly significant under a low temperature condition, thus being regarded as a low temperature zone.

FIG. 9 shows that the charge period of the pixel reduces with the increasing of the resolution of an LCD display having a horizontal driver 24. As shown in FIG. 9, the lower the resolution of the LCD display is, the longer period is required for the pixel to be charged, and vice versa. Moreover, as the HSWs are sequentially switched on corresponding to a set of 24 data lines, the data line configured at the rear end of the horizontal driver may have a relatively short period to evenly charge the pixel in comparison with the data line at the front end of the horizontal driver. Such issue becomes more serious under a low temperature condition, thus creating a low temperature zone or a so-called mura situation, corresponding to a set of 24 data lines, occurring at the right side of the display under the low temperature condition.

Therefore, techniques to address the image quality issue caused by the design of the HSR, especially the mura situation relating to the horizontal driver under a low temperature condition, are highly desired in this field.

SUMMARY OF THE INVENTION

An object of the present invention is to provide a driving device for a display for bilaterally driving a pixel matrix containing N×M pixel units.

To achieve the aforementioned object of the present invention, a driving device for a display for driving a pixel matrix containing N×M pixel units is provided. The provided driving device includes a first vertical driver generating N first vertical driving signals in sequence and a second vertical driver generating N second vertical driving signals in sequence. In the present invention, each of N first vertical driving signals are used to drive the first through the K-th pixel units on each row of the pixel matrix, while each of N second vertical driving signals are used to drive the (K+1)-th through the M-th pixel units on each row of the pixel matrix.

To achieve the aforementioned object of the present invention, an image display system is further provided. The provided image display system includes an LCD display and a power supply coupled thereto. The LCD display includes a pixel matrix containing N×M pixel units and a driving device for a display for driving the pixel matrix. The driving device is constructed by a first vertical driver generating N first vertical driving signals in sequence, and a second vertical driver generating N second vertical driving signals in sequence. In the present invention, each of N first vertical driving signals are used to drive the first through the K-th pixel units on each row of the pixel matrix, while each of N second vertical driving signals are used to drive the (K+1)-th through the M-th pixel units on each row of the pixel matrix.

The driving device for a display of the present invention adopts a first and a second vertical driver to bilaterally drive the pixel matrix, whereby the time during which the pixel is charged with the data line is increased. In this manner, the mura issue, i.e. the vertical streaks corresponding to the 24 data lines on the right side of the display, caused by the horizontal driver under a low temperature condition is addressed.

The aforementioned objects or features of the present invention will be described in more details hereinafter with reference to the accompanying drawings and preferred embodiments. It is to be understood that the accompanying drawings and preferred embodiments are given solely for the purposes of illustration and are not to be construed as limitations of the present invention.

DETAILED DESCRIPTION OF THE PREFERRED EMBODIMENTS

The present invention will now be described in more details hereinafter with reference to the accompanying drawings, in which the preferred embodiments of the invention are shown. This invention may, however, be embodied in many different forms and should not be construed as limitations to the embodiments set forth herein; rather, these embodiments are provided so that this disclosure will be thorough and complete, and will fully convey the scope of the invention to those skilled in the art.

Figure 1:
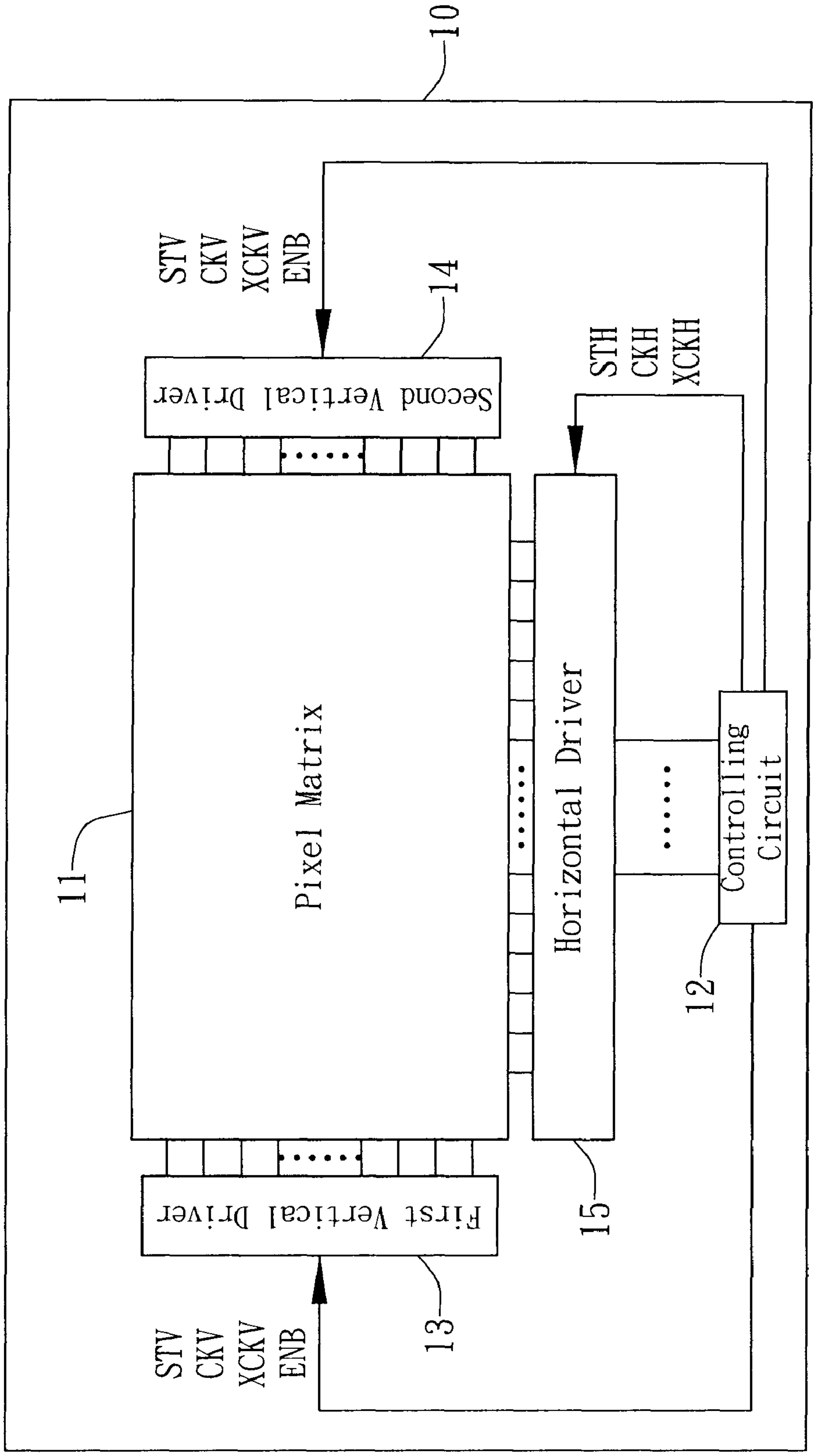
FIG. 1 schematically shows the construction of an LCD in accordance with a preferred embodiment of the present invention.

FIG. 1 schematically shows the construction of an LCD in accordance with a preferred embodiment of the present invention. In this embodiment, the LCD 10 includes a pixel matrix 11, a controlling circuit (ASIC) 12 and a driving device constructed by a first vertical driver 13, a second vertical driver 14 and a horizontal driver 15.

The controlling circuit 12 is connected to the first vertical driver 13, the second vertical driver 14 and the horizontal driver 15, and transmits the control signals STV, CKV, XCKV and ENB to the first and second vertical drivers 13 and 14 and the respective clock signals of the control signals STH, CKH and XCKH to the horizontal driver 15 such that the image display of the pixel matrix 11 is controlled.

Figure 2:
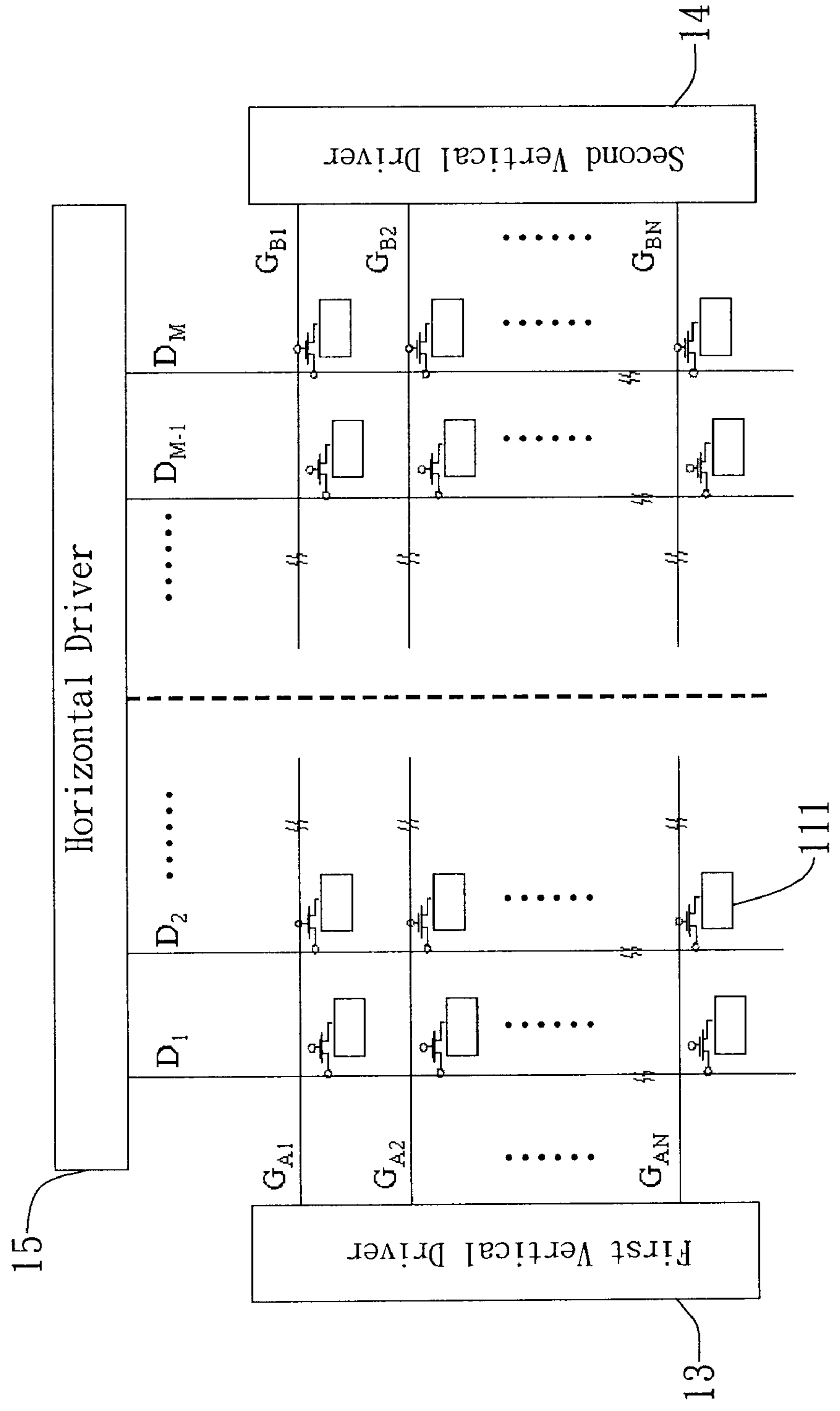
FIG. 2 is a diagram schematically showing the equivalent circuit of a driving device for a display in accordance with a preferred embodiment of the present invention.

FIG. 2 is a diagram schematically showing the equivalent circuit of a driving device for a display in accordance with a preferred embodiment of the present invention. The driving device is configured to drive the pixel matrix 11. In this embodiment, the pixel matrix 11 contains N×M pixel units 111. The first vertical driver 13 includes N gate lines $G_{A1}$~$G_{AN}$, which generate N first vertical driving signals in sequence. Each of the N first vertical driving signals functions to drive the first through the K-th pixel units 111 on each row of the pixel matrix 11. The second vertical driver 14 also includes N gate lines $G_{B1}$~$G_{BN}$, which generate N second vertical driving signals in sequence. Each of the N second vertical driving signals functions to drive the (K+1)-th through the M-th pixel units 111 on each row of the pixel matrix 11. The horizontal driver 15 includes M data lines $D_1$~$D_M$ for controlling M pixel units 111 on each row of the pixel matrix 11, respectively.

Figure 3:
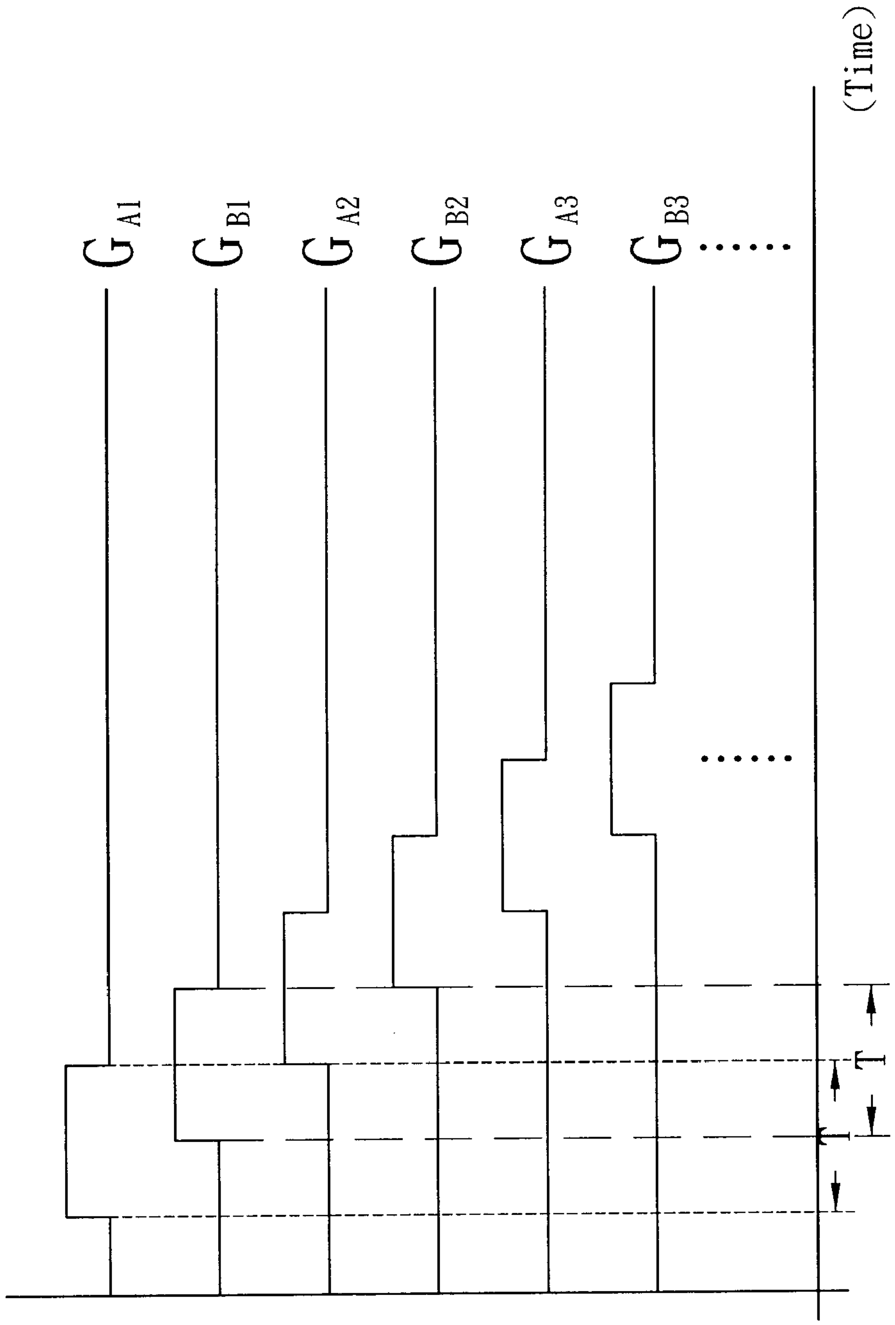
FIG. 3 is a timing diagram illustrating the pulse sequence of the first and second vertical driving signals of a driving device for a display in accordance with a preferred embodiment of the present invention.

FIG. 3 is a timing diagram illustrating the pulse sequence of the first and second vertical driving signals of a driving device for a display in accordance with a preferred embodiment of the present invention. According to the present invention, the mentioned N first vertical driving signals are closely connected to each other in sequence, and each thereof has a function period of T. As well, the N second vertical driving signals are closely connected to each other in sequence, and each thereof also has a function period of T. Moreover, the function period of each second vertical driving signal begins at a start time between that of a corresponding first vertical driving signal and a period value of (K/M)T. In this embodiment, M is preferably 2K such that each second vertical driving signal begins to function, e.g. to be transmitted, at a time point of half of the function period of a corresponding first vertical driving signal later the first vertical driving signal begins to function. In this case, M data signals are transmitted through M data lines of the horizontal driver 15 to M pixel units on each row of the pixel matrix 11 corresponding to each first vertical driving signal within the function period of such first vertical driving signal.

Figure 4:
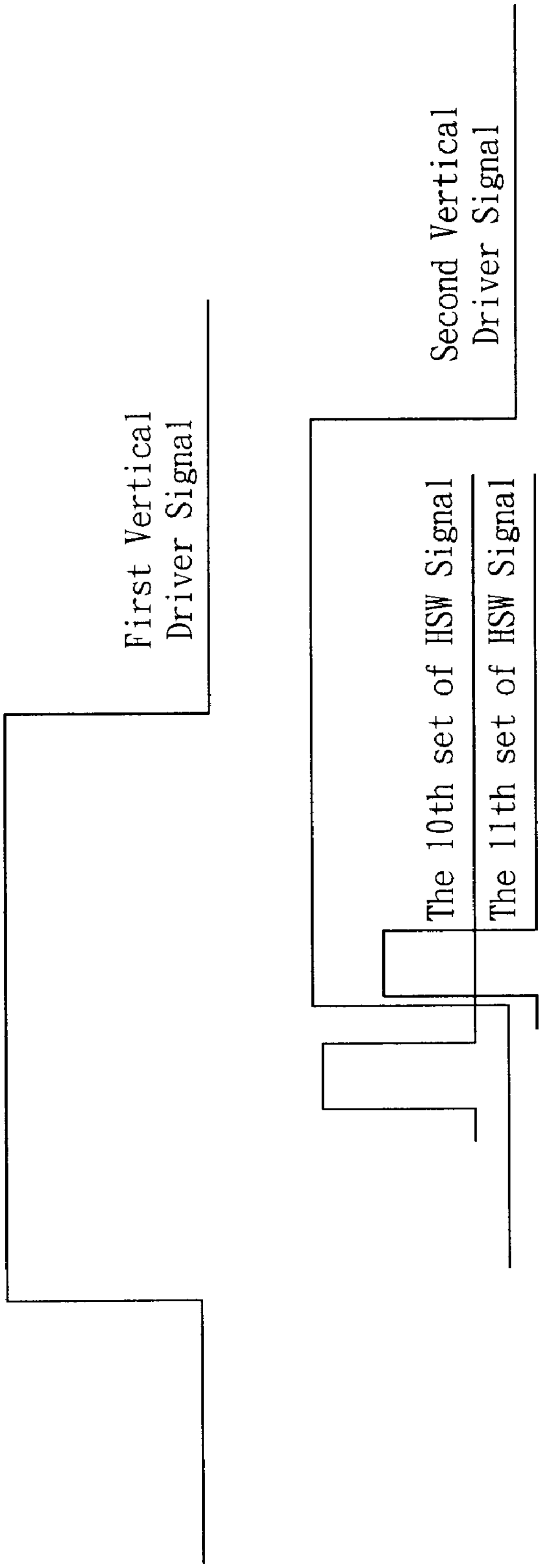
FIG. 4 is a timing diagram illustrating the respective function periods of the first and second vertical driving signals of a driving device for a display in accordance with a preferred embodiment of the present invention.

FIG. 4 is a timing diagram illustrating the respective function periods of the first and second vertical driving signals of a driving device for a display in accordance with a preferred embodiment of the present invention. In this embodiment, there are 20 sets of HSWs configured in the horizontal driver 15. During the charging process, the gate of the first vertical driver 13 is firstly conducted to enable the first vertical driver 13 to generate N first vertical driving signals in sequence to drive the first through the 10-th pixel units 111 on each row of the pixel matrix 11. Meanwhile, 20 data lines of the horizontal driver 15 are enable to transmit 20 data signals to 20 pixel units 111 on each row of the pixel matrix 11 corresponding to each first vertical driving signal within the function period T thereof. Then, the gate of the second vertical driver 14 is conducted to enable the second vertical driver 14 to generate N second vertical driving signals in sequence to drive the 11-th through the 20-th pixel units 111 on each row of the pixel matrix 11. In this manner, it allows the 11-th through the 20-th pixel units 111 to gain more sharing time. Consequently, the mura issue, i.e. the vertical streaks corresponding to the 24 data lines on the right side of the display, caused by the horizontal driver 15 under a low temperature condition is addressed.

Figure 5:
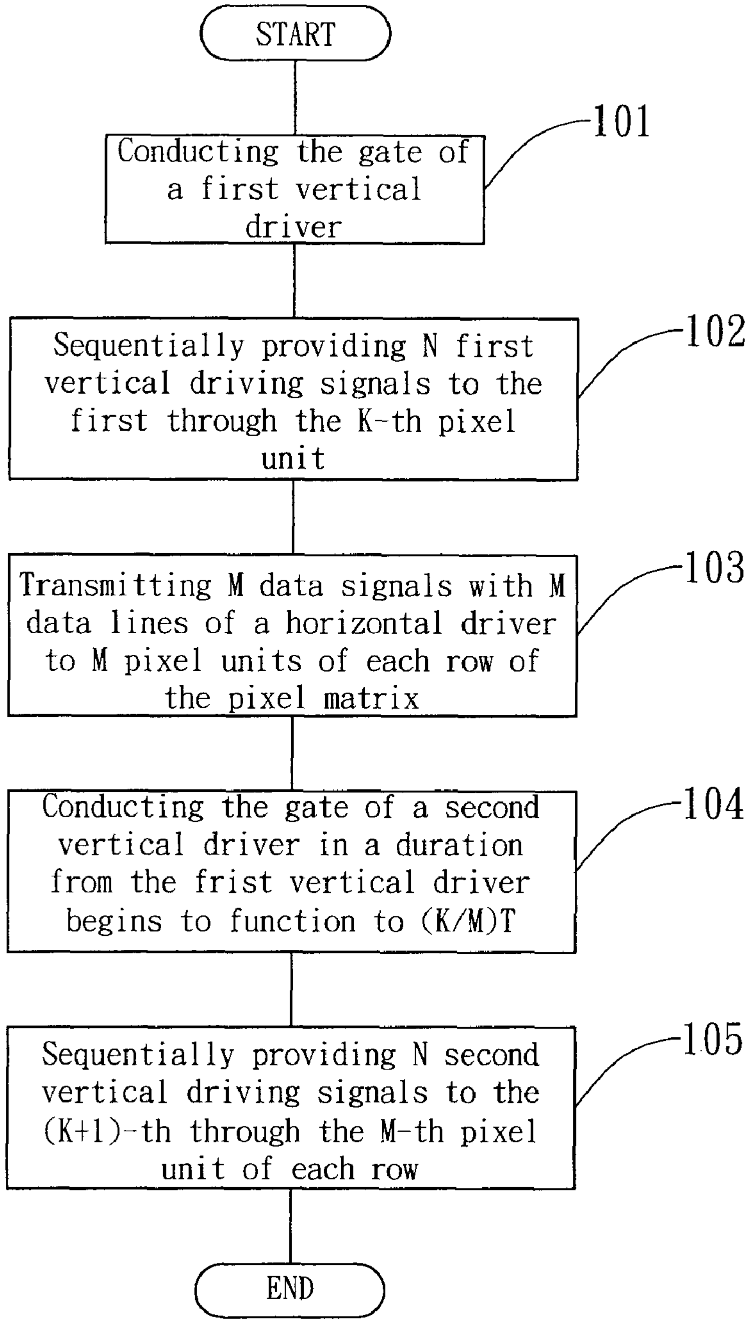
FIG. 5 is a flow chart showing the driving method for a display in accordance with a preferred embodiment of the present invention.

FIG. 5 is a flow chart showing the driving method for a display in accordance with a preferred embodiment of the present invention. The driving method shown in FIG. 5 is applied to drive a pixel matrix 11 containing N×M pixel units 111. The driving method according to the present invention includes the steps as follows. First, the gate of the first vertical driver 13 is conducted (Step 101), so as to enable the first vertical driver 13 to sequentially provide N first vertical driving signals to the first through the K-th pixel units 111 on each of N rows of the pixel matrix 11 (Step 102). M data signals are transmitted through M data lines of the horizontal driver 15 to M pixel units 111 on each row of the pixel matrix 11 corresponding to each first vertical driving signal within the function period T of the first vertical driving signal (Step 103). In the duration from the first vertical driving signal begins to function to (K/M)T, the gate of the second vertical driver 14 is conducted (Step 104). The second vertical driver 14 is enabled to sequentially provide N second vertical driving signals to the (K+1)-th through the M-th pixel units 111 on each of N rows of the pixel matrix 11 (Step 105).

Figure 6:
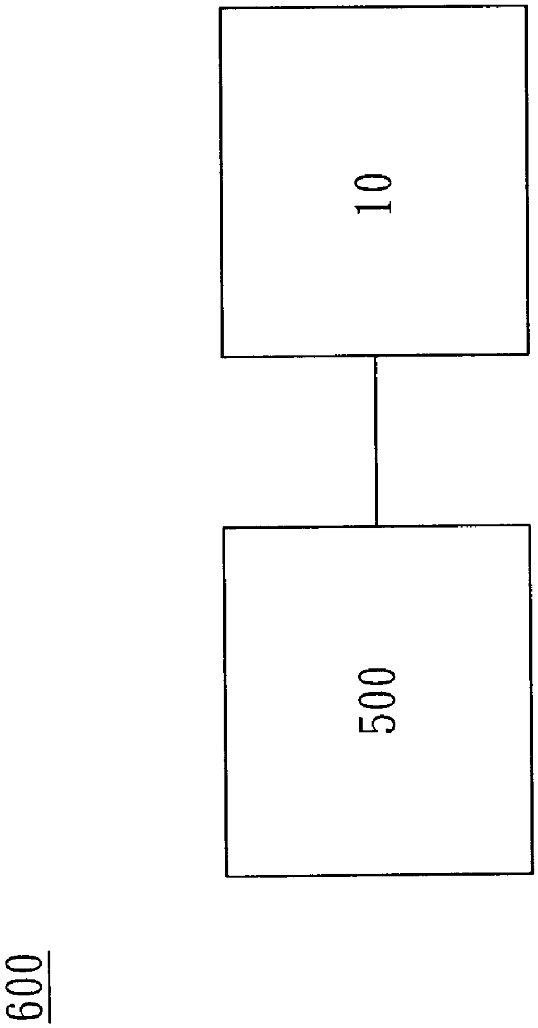
FIG. 6 is a diagram schematically representing the construction of an image display system in accordance with a preferred embodiment of the present invention.
Figure 7:
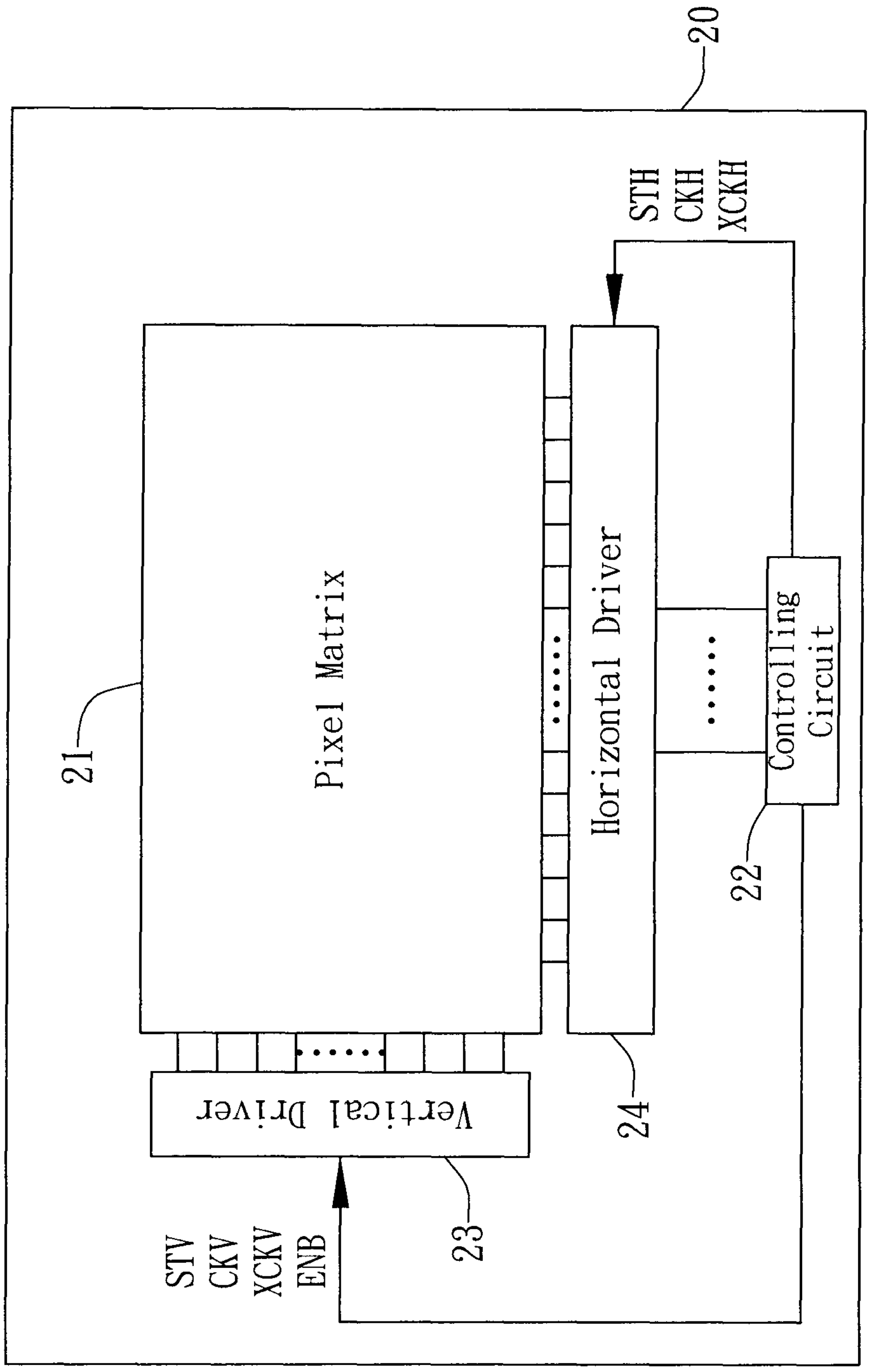
Fig. 7 (Prior Art)
FIG. 7 shows the construction of a conventional LCD according to the prior art.
Figure 8:
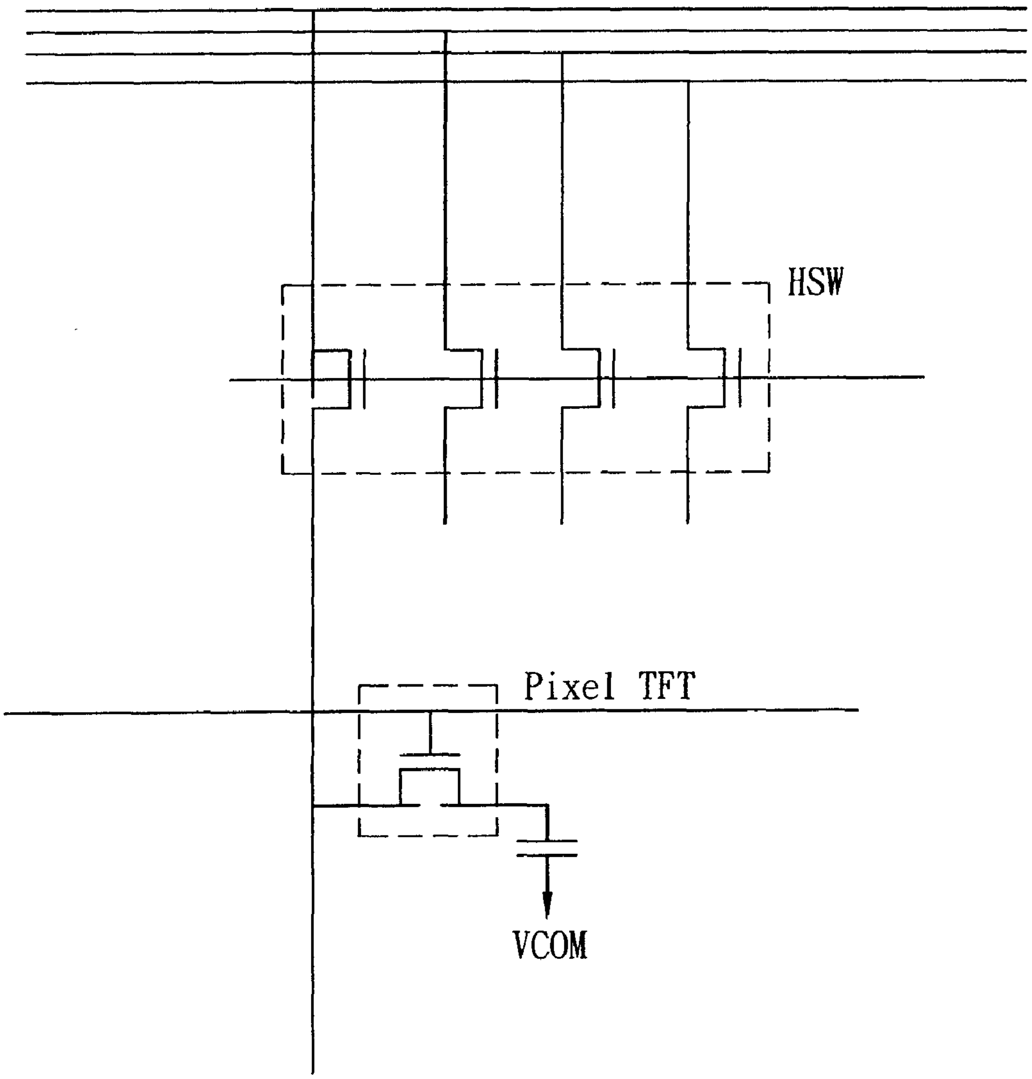
Fig. 8 (Prior Art)
FIG. 8 is a diagram schematically illustrating how the pixel of the conventional LCD is charged with the data line according to the prior art.
Figure 9:
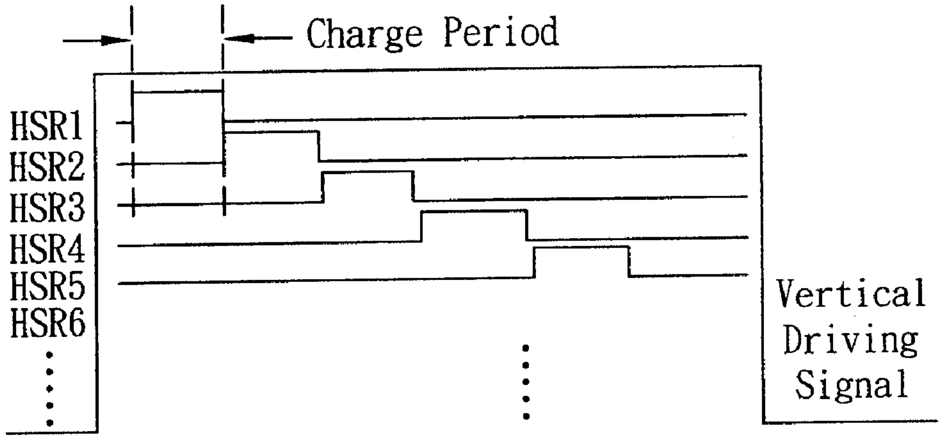
Fig. 9 (Prior Art)
FIG. 9 is a diagram schematically showing the respective charge periods for the conventional displays of high resolution and of low resolution according to the prior art.
Figure 9:
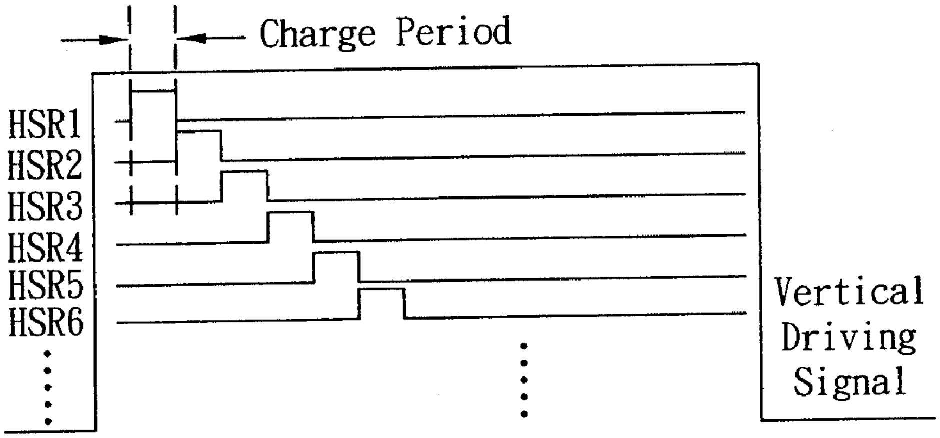
Fig. 9 (Prior Art)

FIG. 6 is a diagram schematically representing the construction of an image display system in accordance with a preferred embodiment of the present invention. In this embodiment, the image display system 600 includes an LCD 10 and a power supply 500. The LCD display 10, which may be a component of an electronic device, includes a pixel matrix 11 containing N×M pixel units 111 and a driving device for a display for driving the pixel matrix 11. The driving device is constructed by a first vertical driver 13 generating N first vertical driving signals in sequence, and a second vertical driver 14 generating N second vertical driving signals in sequence, wherein each of N first vertical driving signals is used to drive the first through the K-th pixel units 111 on each row of the pixel matrix 11 and each of N second vertical driving signals is used to drive the (K+1)-th through the M-th pixel units 111 on each row of the pixel matrix 11. The power supply 500 is coupled to the LCD 10 to provide the LCD 10 with the electrical power. The image display system 600 may be a mobile phone, a digital camera, a personal digital assistant (PDA), a laptop computer, a desktop computer, a television, a global positioning system (GPS), an automotive display, an aerial display, a digital photo frame or a portable digital versatile disc (DVD) player.

The driving device for a display of the present invention extends the time period for charging the pixel with the data line via a bilaterally driving circuit constructed by the first and second vertical drivers, and thereby the mura issue, i.e. the vertical streaks corresponding to the 24 data lines on the right side of the display, caused by the horizontal driver under a low temperature condition is addressed.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. A driving device for a display for driving a pixel matrix containing N×M pixel units, comprising:

a first vertical driver generating N first vertical driving signals in sequence each having a function period of T, each of said N first vertical driving signals being used to drive the first through the K-th pixel units on each row of said pixel matrix;

a second vertical driver generating N second vertical driving signals in sequence each having a function period of T, each of said N second vertical driving signals being used to drive the (K+1)-th through the M-th pixel units on each row of said pixel matrix, wherein the M-th pixel unit is located at a right side of said pixel matrix; and a horizontal driver having M data lines providing data signals to said M pixel units on each row of said pixel matrix, respectively, wherein each of said second vertical driving signal has a start time ranged between that of a corresponding first vertical driving signal and (K/M)T, but said start time of said second vertical driving signal is not simultaneous to that of said corresponding first vertical driving signal, whereby said first and second vertical drivers extend a time period for charging said pixel units with said data lines from said horizontal driver to thereby avoiding mura effect at the right side of said pixel matrix otherwise caused by said horizontal driver under a low temperature condition.

2. The driving device according to claim 1, wherein said N first vertical driving signals are sequentially connected to each other.

3. The driving device according to claim 2, wherein said N second vertical driving signals are sequentially connected to each other.

4. The driving device according to claim 1, wherein M is 2K, and the function period of each of said second vertical driving signals begins at half of said function period of a corresponding first vertical driving signal.

5. The driving device according to claim 1, wherein said M data lines of said horizontal driver transmit M data signals to M pixel units on each row of said pixel matrix corresponding to each of said first vertical driving signals within the function period thereof.

6. A driving method for a display for driving a pixel matrix containing N×M pixel units, comprising the steps of:

sequentially providing N first vertical driving signals, each having a function period of T, to the first through the K-th pixel units on each of N rows of said pixel matrix;

sequentially providing N second vertical driving signals, each having a function period of T, to the (K+1)-th through the M-th pixel units on each of N rows of said pixel matrix, wherein the M-th pixel unit is located at a right side of said pixel matrix; and providing M data signals to M pixel units on each row of said pixel matrix, respectively, wherein each of said second vertical driving signal has a start time ranged between that of a corresponding first vertical driving signal and (K/M)T, but said start time of said second vertical driving signal is not simultaneous to that of said corresponding first vertical driving signal, whereby said first and second vertical driving signals extend a time period for charging said pixel units with said data signals to thereby avoiding mura effect at the right side of said pixel matrix otherwise caused by data signals provided under a low temperature condition.

7. The driving method according to claim 6, wherein said N first vertical driving signals are sequentially closely connected to each other.

8. The driving method according to claim 7, wherein said N second vertical driving signals are sequentially closely connected to each other.

9. The driving method according to claim 6, wherein M is 2K, and said function period of each of said second vertical driving signals begins at half of said function period of a corresponding first vertical driving signal.

10. The driving method according to claim 6, wherein M data signals are provided to M pixel units on each row of said pixel matrix corresponding to each of said first vertical driving signals within the function period thereof.

11. An image display system, comprising:

a pixel matrix containing N×M pixel units; and a driving device for a display for driving said pixel matrix, said driving device for a display comprising:

a first vertical driver generating N first vertical driving signals, each having a function period of T, each of said N first vertical driving signals being used to drive the first through the K-th pixel units on each row of said pixel matrix;

a second vertical driver generating N second vertical driving signals, each having a function period of T, each of said N second vertical driving signals being used to drive the (K+1)-th through the M-th pixel units on each row of said pixel matrix, wherein the M-th pixel unit is located at a right side of said pixel matrix; and a horizontal driver having M data lines providing data signals to said M pixel units on each row of said pixel matrix, respectively, wherein each of said second vertical driving signal has a start time ranged between that of a corresponding first vertical driving signal and (K/M)T, but said start time of said second vertical driving signal is not simultaneous to that of said corresponding first vertical driving signal, whereby said first and second vertical drivers extend a time period for charging said pixel units with said data lines from said horizontal driver to thereby avoiding mura effect at the right side of said pixel matrix otherwise caused by said horizontal driver under a low temperature condition.

12. The image display system according to claim 11, wherein said image display system is one selected from a group consisting of a mobile phone, a digital camera, a personal digital assistant (PDA), a laptop computer, a desktop computer, a television, an automotive display, an aerial display, a global positioning system (GPS) and a portable digital versatile disc (DVD) player.

* * * * *